US009015127B2

(12) United States Patent
Rang et al.

(10) Patent No.: US 9,015,127 B2
(45) Date of Patent: Apr. 21, 2015

(54) FILE ARCHIVING SYSTEM AND METHOD

(75) Inventors: Anton B. Rang, Houlton, WI (US); Harriet G. Coverston, New Brighton, MN (US)

(73) Assignee: Oracle America, Inc., Redwood City, CA (US)

( * ) Notice: Subject to any disclaimer, the term of this patent is extended or adjusted under 35 U.S.C. 154(b) by 2121 days.

(21) Appl. No.: 11/616,512

(22) Filed: Dec. 27, 2006

(65) Prior Publication Data

US 2008/0162598 A1 Jul. 3, 2008

(51) Int. Cl.
*G06F 7/00* (2006.01)
*G06F 17/30* (2006.01)

(52) U.S. Cl.
CPC .... *G06F 17/30191* (2013.01); *G06F 17/30194* (2013.01); *G06F 17/30073* (2013.01); *G06F 17/30221* (2013.01)

(58) Field of Classification Search
CPC .................... G06F 17/30073; G06F 17/30194; G06F 17/30191; G06F 17/30144
USPC ................................. 707/661, 667, 672, 827
See application file for complete search history.

(56) References Cited

U.S. PATENT DOCUMENTS 5,151,988 A * 9/1992 Yamagishi .................... 395/600
5,668,991 A * 9/1997 Dunn et al. ................... 395/618
5,675,725 A * 10/1997 Malcolm ........................... 714/6
5,684,991 A * 11/1997 Malcolm ....................... 707/640
6,460,054 B1 * 10/2002 Grummon ..................... 707/204
6,505,216 B1 * 1/2003 Schutzman et al. .......... 707/204
6,802,025 B1 * 10/2004 Thomas et al. ................. 714/15
7,165,059 B1 * 1/2007 Shah et al. ......................... 707/1
7,395,387 B2 * 7/2008 Berkowitz et al. ............ 711/162
2002/0138504 A1 * 9/2002 Yano et al. .................... 707/204
2007/0282868 A1 * 12/2007 Wanigasekara-Mohotti et al. ............................. 707/100

OTHER PUBLICATIONS

Curtis Preston, "Excerpt from the Oracle Backup and Recover Chapter of Unix Backup & Recovery," www.backupcentral.com/oracle-hot-backup.html, pp. 1-4.
Dingshan He, Xianbo Zhang, David H.C. Du, Gary Grider, "Coordinating Parallel Hierarchical Storage Management in Object-Base Cluster Files Systems," www.dtc.umn.edu/publications/reports/2006_13.pdf., 15 pages.

* cited by examiner

*Primary Examiner* — Marc Somers
(74) *Attorney, Agent, or Firm* — Brooks Kushman P.C.

(57) ABSTRACT

A method for archiving a file that has multiple file parts stored on multiple object storage devices of a computer system includes the steps of saving the file parts on one or more archive devices, allowing one or more changes to be made to the file during the saving step, and applying at least one of the changes made during the saving step to one of the file parts stored on a respective object storage device. Furthermore, the method is performed such that the file parts saved on the one or more archive devices do not include the one or more changes made to the file during the saving step.

16 Claims, 2 Drawing Sheets

FILE ARCHIVING SYSTEM AND METHOD

BACKGROUND OF THE INVENTION

1. Field of the Invention

The invention relates to a system and method of archiving files stored on multiple object storage devices.

2. Background Art

An object-based file system may distribute a file across multiple object storage devices for performance or redundancy purposes. It may be desirable to back up or archive such a file in a consistent manner, e.g., saving the file as it existed at a specific point in time. One known archiving method achieves consistency by preventing access to the file during archiving operations, thereby stopping any running applications.

SUMMARY OF THE INVENTION

Under the invention, a novel method is provided for archiving a file that has multiple file parts stored on multiple object storage devices of a computer system. An example of such a method includes the steps of saving the file parts on one or more archive devices; allowing one or more changes to be made to the file during the saving step; and applying at least one of the changes made during the saving step to one of the file parts stored on a respective object storage device. Furthermore, the method is performed such that the file parts saved on the one or more archive devices do not include the one or more changes made to the file during the saving step.

As another example, a method of archiving a file that has multiple file parts stored on multiple object storage devices of a computer system includes the steps of saving the parts on one or more archive devices; establishing a journal file to receive changes made to the file during the saving step; and after the saving step, applying at least one change received in the journal file to at least one of the file parts stored on a respective object storage device.

Further under the invention, a novel computer system is provided for archiving a file having multiple file parts. In one embodiment, the computer system comprises multiple object storage devices for storing the file parts, and a processor in communication with the object storage devices. The processor includes instructions for saving the file parts on one or more archive devices, instructions for establishing a journal file to receive changes made to the file while the file parts are being saved on the one or more archive devices, and instructions for applying at least one change received in the journal file to at least one of the file parts stored on a respective object storage device after the file parts have been saved on the one or more archive devices.

While exemplary embodiments in accordance with the invention are illustrated and disclosed, such disclosure should not be construed to limit the claims. It is anticipated that various modifications and alternative designs may be made without departing from the scope of the invention.

DETAILED DESCRIPTION

Figure 1:
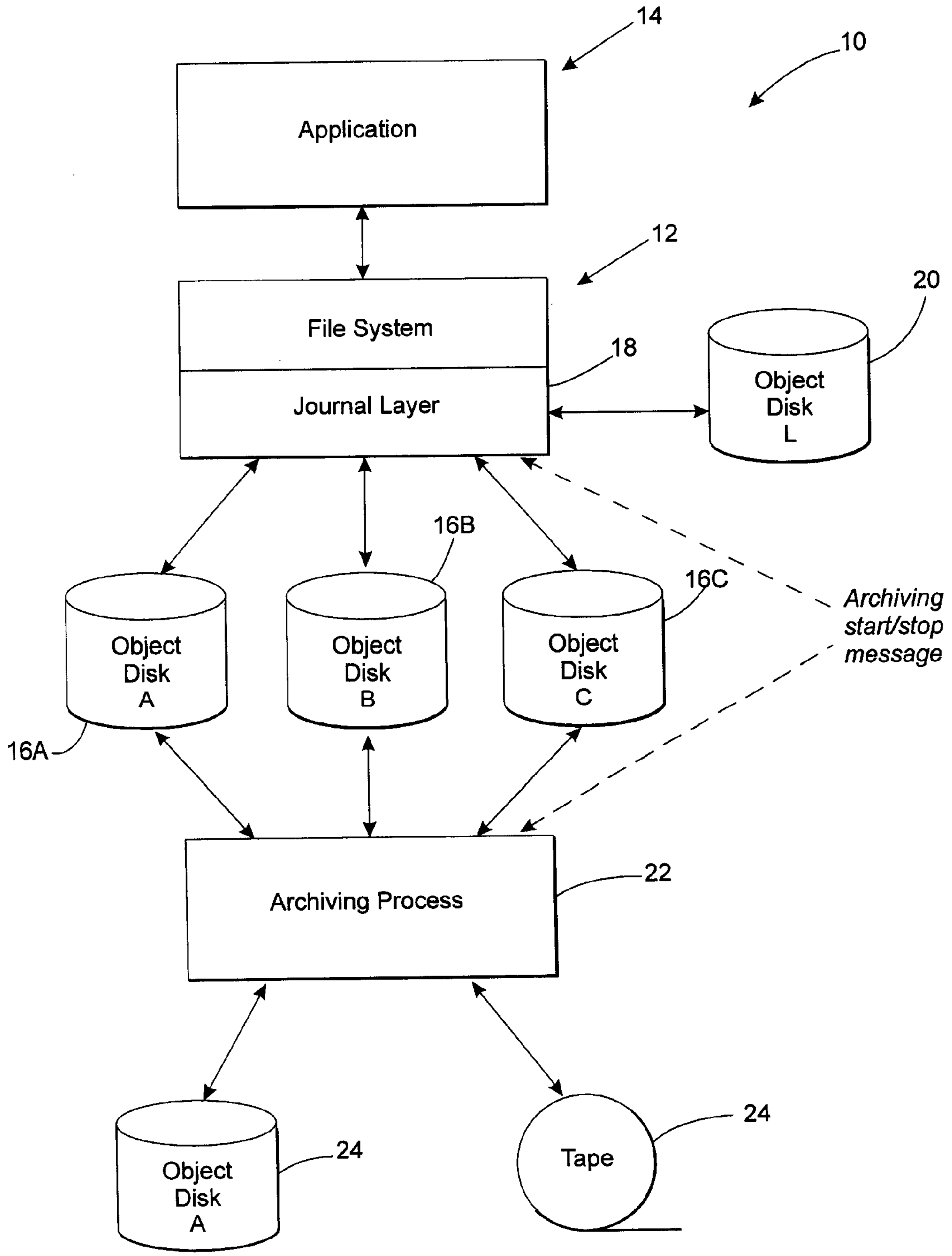
FIG. 1 is a schematic view of a computer system that is configured to archive files according to the invention.

FIG. 1 shows a schematic representation of a computer system 10 that is configured to archive files using a novel method, as explained below in detail. The computer system 10 shown in FIG. 1 includes an object-based file system 12 and one or more applications 14, such as databases, editors, and/or image processors, that are in communication with the file system 12.

The file system 12 includes multiple object storage devices 16A-C, such as tape, disk or fixed memory storage devices, for storing multiple files. With such a configuration, each file may be divided into multiple file parts that are stored on the object storage devices 16A-C. For example, a particular file F may be divided into multiple parts, such as F.A, F.B and F.C, which may be stored on object storage devices 16A, 16B and 16C, respectively. Furthermore, each file part F.A-C may have an associated attribute file identifier to identify the associated file F to which the file part F.A-C belongs, and the file identifiers may be stored with the file parts F.A-C on the object storage devices 16A-C. Still further, each file part F.A-C may be stored with sufficient meta information, such as a multi-dimensional address, that identifies the particular object, such as a block or category, on a particular object storage device 16A-C in which the file part F.A-C is stored, as well as the location within the particular object at which the file part F.A-C may be found.

Additional details regarding object-based storage devices may be found in American National Standards Institute, International Committee for Information Technology Standards Document No. 400-2004 (ANSI/INCITS 400-2004), entitled Information Technology—SCSI Object-Based Storage Device Commands (OSD). That document, which published on Dec. 15, 2004, is hereby incorporated by reference in its entirety.

The file system 12 further includes a journal portion, such as journal layer 18, that is configured to create or otherwise establish temporary journal files for use during the archiving process. For example, one or more journal files, such as log file L having an associated log map, may be established on journal storage device 20.

The computer system 10 further includes an archive portion, such as archive layer 22, that is configured to archive files on one or more archive storage devices 24, such as an disks, tape, and/or fixed memory. Although the archive storage devices 24 are shown as separate devices from the object storage devices 16A-C, the archive devices 24 and the object storage devices may be the same.

Figure 2:
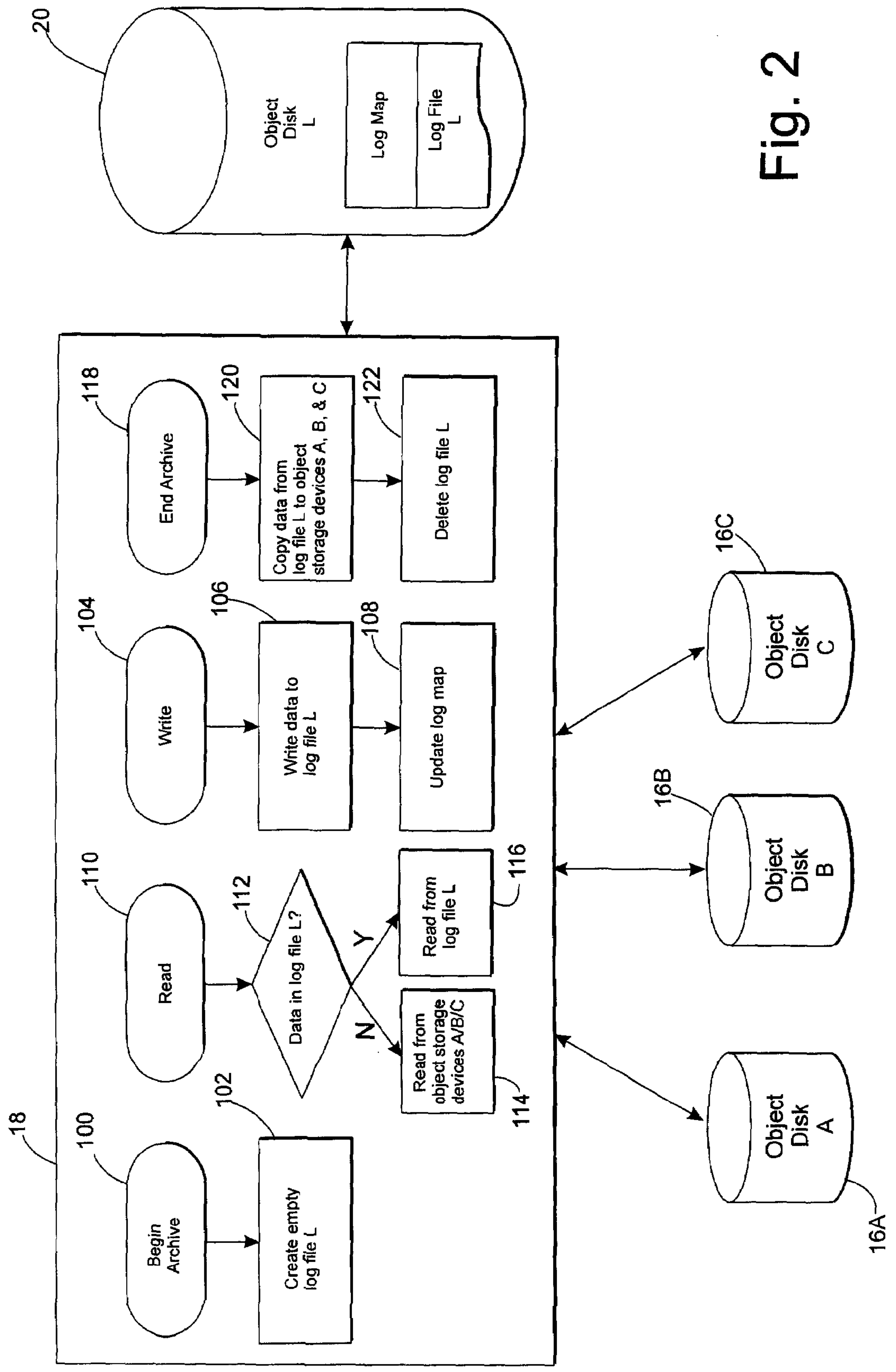
FIG. 2 is a schematic representation of the archiving process.

Referring to FIGS. 1 and 2, a method of archiving a file, such as file F, will now be described. It should be noted that the computer system 10 may include one or more processors (not shown), such as microprocessors, that include instructions for carrying out the method steps described below in detail.

First, when the computer system 10 is instructed to archive file F, the computer system 10 may notify file system 12 that file F is about to be archived. The file system 12 may then flush or otherwise apply any file changes, which may be stored on the computer system 12 in one more locations other than the object storage devices 16A-C, to the file parts F.A-C. For example, file changes that are temporarily stored in buffers of the file system 12 may be applied to one or more of the file parts F.A-C stored on the object storage devices 16A-C.

At the beginning of the archive process, shown schematically at block 100 in FIG. 2, the file system 12 may also create or otherwise establish a journal file, such as log file L shown at block 102, on journal storage device 20 to receive any additional file changes made while the file parts F.A-C are being archived. The file system 12 may then switch file F into a "journal mode" of operation. In that mode, file F may continue to be used, and any changes made to file F during the archiving process may be written or saved to log file L, rather than to the file parts F.A, F.B and/or F.C.

Next, the archiving process involves copying or saving file parts F.A-C to alternate storage, such as one or more archive storage devices 24 shown in FIG. 1. For example, each file part F.A-C may be saved on a separate storage device 24, or all file parts F.A-C may be saved on a single storage device 24.

During the saving step, the file system 12 may divert all changes to file F to the log file L. For example, during a write operation involving file F, shown at block 104 in FIG. 2, all changes made to file F may be written to log file L, as shown at block 106, and the corresponding log map may be updated accordingly, as shown at block 108. If multiple changes are made to a particular portion or range of file F at different periods of time during the saving step, file system 12 may be configured to save only the most recent change in log file L, and identify only the most recent change in the log map of log file L. For example, if a particular portion of file part F.B is revised at a first time $T_1$ and then later revised at a second time $T_2$, file system 12 may overwrite in log file L the revision made at first time $T_1$ with the revision made at second time $T_2$, and may also update the log map of log file L to identify only the revision made at second time $T_2$.

Furthermore, the file system 12 may consult log file L when file F is being read during the above saving step to ensure that the most current date is read. For example, during a read operation involving file F, shown at block 110 in FIG. 2, the file system 12 may check the log map of log file L to see if any changes have been saved therein, as shown at block 112. If not, data is read from the object storage devices 16A-C, as indicated at block 114. If changes are present in log file L, then file system 12 may read data from log file L and the object storage devices 16A-C, as indicated at block 116.

At the end of the archiving process, identified at block 118 in FIG. 2, any file changes received in log file L may be applied to the file parts F.A-C stored on the object storage devices 16A-C, as indicated at block 120. For example, all changes made to each file part F.A-C may be copied or saved to the respective object storage device 16A-C, such that each file part F.A-C stored on a respective storage device 16A-C will include all updates made to the particular file part F.A-C made during the archiving process. Log file L may then be deleted or emptied, as indicated at block 122. Thus, log file L may be a temporary file that is deleted after the archiving process is completed.

With the above method, a consistent archive of file F may be achieved, while still allowing use of file F during the archiving process. More specifically, a complete archive of file F, as it existed at a specific point in time, may be obtained, while still allowing changes to be made to file F during the archiving process. Furthermore, the archive of file F may be stored on one or more storage devices that are different than the object storage devices 16A-C. As another example, the archive of file F may be stored on one or more of the object storage devices 16A-C.

In one embodiment, the computer system 10 may be configured to notify the file system 12 as archiving for each file part F.A-C is completed, such that the file system 12 may write or otherwise apply changes directly to a file part that has been archived, and send to the log file L changes to file parts that have not yet been archived. For example, once a copy of file part F. A has been saved on a particular archive device 24, computer system 10 may notify file system 12 that file part F. A has been archived, and thereafter allow any additional changes to file part F.A to be written directly to file part F.A on object storage device 16A. Furthermore, changes to file part F.A stored in log file L may be applied to file part F.A stored on object storage device 16A after archiving of file part F.A has been completed. Changes to the other file parts F.B and F.C may continue to be written to the log file L until the archives of those file parts are completed.

The computer system 10 may also be configured to notify application 14 that a particular file is about to be archived, so that application 14 can make that file consistent from the application's point of view before the archiving process begins. For example, if application 14 is writing to file F prior to commencement of an archiving process involving file F, the computer system 10 may notify application 14 that the archiving process is about to begin and allow application 14 to complete or stop any changes to file F currently underway. The computer system 10 may also provide an additional notification to the application 14 once file F is in journal mode, so that application 14 may again write to file F. Once file F is in journal mode, changes to file F may be applied to log file L.

It should be noted that the journal mode described above may only be introduced during the archiving process. Otherwise, for typical write operations that occur outside of an archiving process, changes to file F may be written directly to one or more of the object storage devices 16 A-C.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of archiving a file that has multiple file parts stored on multiple object storage devices of a computer system, wherein the file parts include first and second file parts and the object storage devices include first and second object storage devices, and wherein the first file part is stored on the first object storage device and the second file part is stored on the second object storage device, the method comprising:

saving the multiple file parts on one or more archive devices;

allowing one or more changes to be made to the file during the saving step;

establishing a journal file to receive at least one of the changes made to the file during the saving step;

applying at least one of the changes made during the saving step to one of the file parts stored on a respective object storage device; and applying at least one first part change to the first file part stored on the first object storage device after the first file part has been saved on a respective archive device, but before the second file part has been saved, such that the at least one first part change is not sent to the journal file;

wherein the file parts saved on the one or more archive devices do not include the one or more changes made to the file during the saving step.

2. The method of claim 1 further comprising applying one or more file changes, stored on the computer system in one more locations other than the object storage devices, to one or more of the file parts stored on the object storage devices prior to the saving step.

3. The method of claim 1 further comprising applying at least one of the changes to a journal file during the saving step.

4. The method of claim 1 further comprising deleting the journal file after the saving step.

5. The method of claim 1 wherein the computer system includes an application that utilizes the file, and wherein the method further comprises notifying the application, prior to the saving step, that the file will be archived.

6. The method of claim 5 further comprising allowing the application to apply at least one file change to at least one file part stored on a respective object storage device prior to the saving step.

7. The method of claim 1 further comprising allowing changes to be made directly to one of the file parts stored on a respective object storage device after the saving step.

8. The method of claim 1 wherein at least one of the archive devices is the same as at least one of the object storage devices.

9. A method of archiving a file that has multiple file parts stored on multiple object storage devices of a computer system, wherein the file parts include first and second file parts and the object storage devices include first and second object storage devices, and wherein the first file part is stored on the first object storage device and the second file part is stored on the second object storage device, the method comprising:

saving the multiple file parts on one or more archive devices;

establishing a journal file to receive changes made to the file during the saving step; and applying at least one first part change to the first file part stored on the first object storage device after the first file part has been saved on a respective archive device, but before the second file part has been saved, such that the at least one first part change is not sent to the journal file.

10. The method of claim 9 further comprising applying one or more file changes, stored on the computer system in one or more locations other than the object storage devices, to one or more of the file parts stored on the object storage devices prior to the saving step.

11. The method of claim 9 further comprising allowing changes to be made directly to one of the file parts stored on a respective object storage device prior to the saving step.

12. The method of claim 11 further comprising, after the saving step, deleting the journal file and allowing changes to be made directly to one of the file parts stored on a respective object storage device.

13. A computer system for archiving a file having Multiple file parts, the computer system comprising:

multiple object storage devices for storing the file parts such that at least one of the file parts is stored on one of the object storage devices and another of the file parts is stored on another of the object storage devices; and a processor in communication with the object storage devices, the processor including instructions for saving the multiple file parts on one or more archive devices, instructions for establishing a journal file to receive changes made to the file while the file parts are being saved on the one or more archive devices, instructions for applying at least one change received in the journal file to at least one of the file parts stored on a respective object storage device after the file parts have been saved on the one or more archive devices, and instructions for applying at least one file part change to the at least one file part stored on the one object storage device after the at least one file part has been saved on a respective archive device, but before the another file part has been saved, such that the at least one file part change is not sent to the journal file.

14. The system of claim 13 wherein the processor further includes instructions for allowing changes to be made directly to one of the file parts stored on a respective object storage device prior to saving the file parts on the one or more archive devices.

15. The system of claim 13 wherein the processor further includes instructions for deleting the journal file after the file parts have been saved on the one or more archive devices.

16. The system of claim 13 wherein the processor further includes instructions for allowing changes to be made directly to one of the file parts stored on a respective object storage device after the file parts have been saved on the one or more archive devices.

* * * * *

UNITED STATES PATENT AND TRADEMARK OFFICE

CERTIFICATE OF CORRECTION

PATENT NO. : 9,015,127 B2
APPLICATION NO. : 11/616512
DATED : April 21, 2015
INVENTOR(S) : Rang et al.

It is certified that error appears in the above-identified patent and that said Letters Patent is hereby corrected as shown below:

In the specification
Column 6, line 1, Claim 13, delete “Multiple” and insert -- multiple --, therefor.

Signed and Sealed this
Ninth Day of February, 2016

Michelle K. Lee
*Director of the United States Patent and Trademark Office*